Patented Jan. 5, 1937

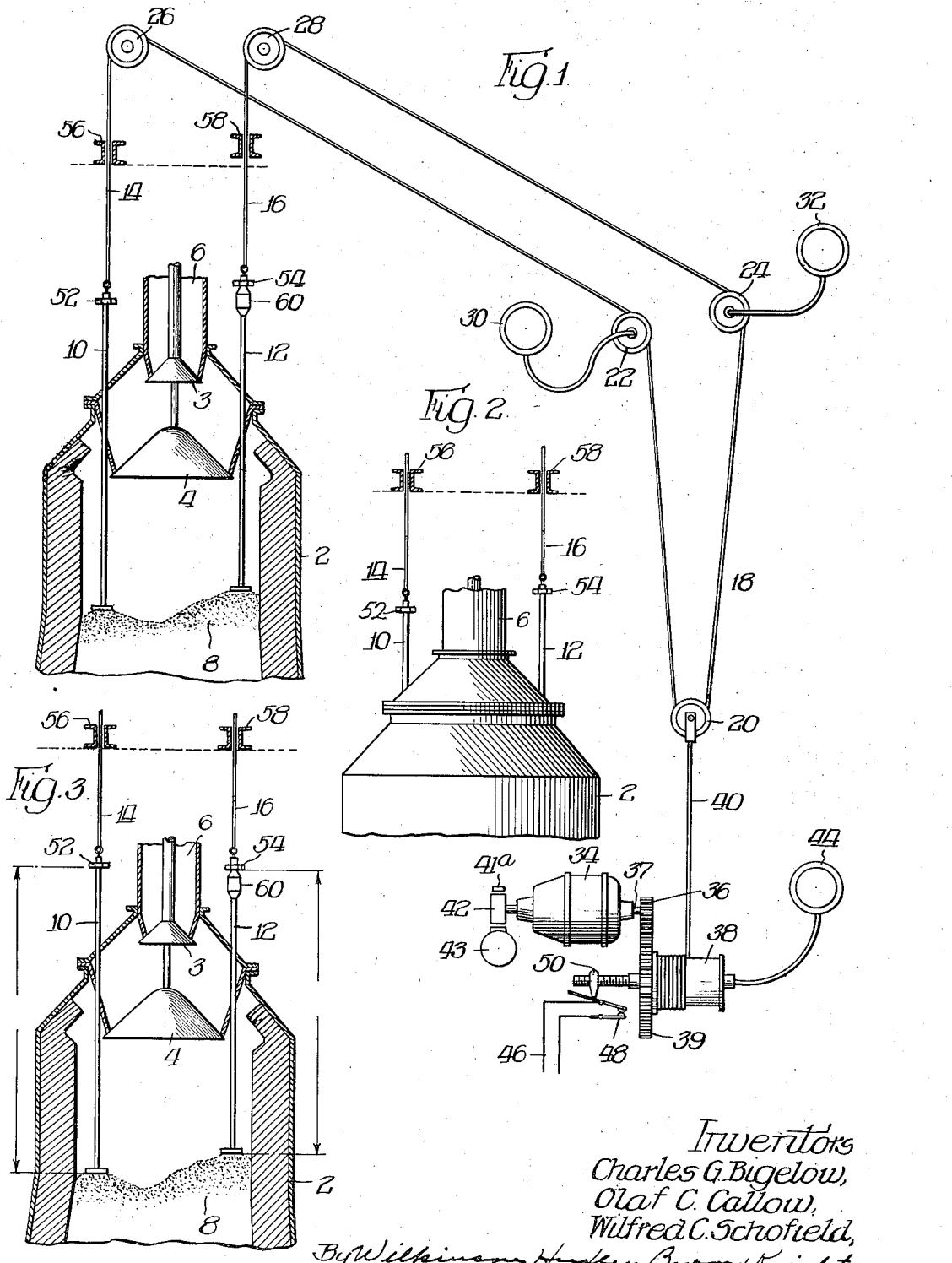
Jan. 5, 1937.    C. G. BIGELOW ET AL    2,066,387
STOCK LINE RECORDER
Filed Aug. 19, 1933

2,066,387

UNITED STATES PATENT OFFICE 2,066,387

STOCK LINE RECORDER

Charles G. Bigelow, Olaf C. Callow, and Wilfred C. Schofield, Chicago, Ill., assignors to Freyn Engineering Company, Chicago, Ill., a corporation of Maine Application August 19, 1933, Serial No. 685,826

25 Claims. (Cl. 33—125)

The present invention relates to stock line recorders.

More particularly the present invention relates to means for indicating the level of the contents within a receptacle. The invention is particularly applicable to blast furnaces and will be described in connection with blast furnaces, though as the description proceeds it will be apparent that the invention has a broader application.

During the course of the operation of a blast furnace the level of the material of course tends to fall and new charges of material are inserted through the top of the furnace from time to time. The level of the top of the material is not uniform and the present invention contemplates means for continuously indicating the height of the material at a plurality of points within the furnace.

The present application is a continuation in part of the application filed by the present applicants on December 4, 1931, Serial No. 578,886, entitled Blast furnaces and the like.

An object of the present invention is to provide novel means for indicating at a plurality of points the height of material within a receptacle.

A further object is to provide means for indicating the level of material within a receptacle at a plurality of points, as well as indicating approximately the average height of said material.

A further object is to accomplish the results of the object immediately above recited in indicating mechanism which is continuous in operation, which is simple, which is inexpensive and not likely to get out of order.

A further object is to provide simple and practical means for indicating the level of material at various points within the receptacle, which means is well adapted to meet the needs of commercial service.

Further objects will appear as the description proceeds.

Referring to the drawing—

Figure 1 is a fragmentary view, parts being shown in cross section, of an embodiment of the present invention applied to a blast furnace or the like;

Figure 2 is a view showing a modification of the structure shown in Figure 1; and Figure 3 illustrates a further modification of the structure shown in Figure 1.

The numeral 2 indicates a blast furnace having the usual charging bells 3 and 4, the bell 3 being the uppermost one, commonly referred to as the small bell, and the bell 4 being the lowermost one, commonly referred to as the large bell.

Associated with the small bell 3 is the hopper 6. As is well known, the two bells 3 and 4 may be opened according to a predetermined order, one of said bells being closed while the other is open, to accomplish the result of depositing a charge of material, indicated by the numeral 8, within the furnace. As is well known in the art, the charge of material 8 may not be at a uniform level or height.

For indicating the level at a plurality of points within the furnace 2 a plurality of try rods are provided. In the drawing two try rods 10 and 12 are shown, which try rods according to the structure shown in Figure 1 may be of uniform length and may be connected to the ends 14 and 16 of a cable 18. Said cable 18, intermediate of its length, passes around the sheave 20, adapted to be operated by means to be referred to presently. The end 14 of the cable 18 is turned over a pair of sheaves 22 and 26, and the end 16 of said cable 18 is turned over the sheaves 24 and 28. Said sheave 22 is connected, through any preferred power transmitting mechanism, to an indicator or recorder 30, and the sheave 24 is connected, through any preferred power transmitting mechanism, to the indicator or recorder 32. The details of the power transmitting mechanism between the sheaves 22 and 24 and the indicators or recorders 30 and 32 are not illustrated for the reason that they form no part of the present invention and for the reason that means suitable for the purpose are well known. It will be understood, of course, that the instruments 30 and 32 may be located at any convenient point distant from the sheaves 22 and 24 if preferred.

It will be understood, of course, that the try rods 10 and 12 should be in raised position when material is being dumped from the large bell 4 into the furnace 2, this being advisable to prevent the bending or burying of the rods 10 and 12 by the material deposited from the bell 4. The means for controlling the position of the try rods 10 and 12 includes the motor 34, which is connected to the pinion 36 by means of the shaft 37. The pinion 36 is operatively connected to a drum 38 through the gear 39, which may be fast with said drum 38. The drum 38 has wound thereon the cable 40, one end of said cable 40 being fixed relative to said drum, the other end of said cable 40 being connected to the sheave 20 through any preferred connector, as for example a yoke.

The shaft 37 of the motor 34 is provided with a brake drum 42 adapted to be frictionally engaged by a shoe 41a of a brake mechanism 43 for holding the rotor of the motor 34 and consequently the cable 40 and the sheave 20 in a predetermined position. Connected to the drum 38 is the indicator or recorder 44, which may be connected to said drum 38 through any preferred power transmitting mechanism, said instrument 44 being located, if preferred, in proximity to the instruments 30 and 32.

As indicated above, the motor 34 will, through the drum 38, cable 40 and cable 18, control the position of the try rods 10 and 12. When a dumping operation is to be performed by the large bell 4, the motor 34 will be operated through control mechanism (not illustrated) to raise the try rods 10 and 12 to the top of the furnace 2. In practice the zero positions of the try rods 10 and 12 will be substantially at the level of the lower edge of the large bell 4. In order to automatically stop the lifting movement of the motor 34, limit switch mechanism is employed involving the electric circuit 46 including the limit switch 48. Said limit switch 48 should be opened when the two try rods 10 and 12 are at the zero position referred to, which in practice will be chosen at the level of the lower edge of the large bell 4. A convenient means for operating the limit switch 48 is by means of the nut 50, which may be weighted on one side and which may travel along a threaded shaft rigid with the drum 38.

The try rods 10 and 12 are provided with the brackets 52 and 54, respectively, adapted to contact with the stops 56 and 58, respectively, which stops 56 and 58 are fixed relative to the blast furnace 2. As indicated in Figure 1, the stop 58 is at a higher level than the stop 56, though the upper contacting surfaces of the brackets 52 and 54 are equidistant from the lower extremities of the try rods 10 and 12, respectively. The try rod 12 is provided with a weight 60 for the purpose of making the weight to be lifted by the end 16 of the cable 18 greater than the weight to be lifted by the end 14 of said cable 18.

In describing the mode of operation of the embodiment of the present invention disclosed in Figure 1 the try rod 10 will be referred to as the light rod and the try rod 12 will be referred to as the heavy rod. It will be understood without detailed explanation that during intervals between dumps of the large bell 4 the try rods 10 and 12 will rest upon the burden 8, the motor 34 exerting a sufficient torque to hold the cable 18 taut without lifting said try rods 10 and 12. Mechanism suitable for the purpose of controlling the cable 18 is illustrated and described in the Whitcomb Patent No. 1,856,897. When it is desired to dump material from the bell 4, switch mechanism, as for example that disclosed in the Whitcomb patent referred to, will be operated to lift the try rods 10 and 12 prior to the opening of the bell 4. Inasmuch as the try rods 10 and 12 are secured to the ends of the cable 18, the rod 10, being the light rod, will normally be raised first, and its bracket 52 will come to rest in abutting relationship with the stop 56. Under these conditions the lower extremity of the try rod 10 will be at substantially the level of the lower edge of the large bell 4. The position referred to of the light rod 10 with the bracket 52 in abutting relationship with the stop 54 provides zero calibration of the instrument 30. As indicated above, the stop 58 is located at a higher level than the stop 56 in the construction as shown in Figure 1. The limit switch 48 and the operating mechanism therefor will be so adjusted that said limit switch 48 opens when the lower extremity of the heavy rod 12 is substantially at the level of the lower edge of the large bell 4. Opening of the limit switch 48 will stop the motor 34 and set the brake 43. Under these conditions the bracket 54 will not have reached abutting relationship with the stop 58 when the zero position of the heavy rod 12 is reached. The stop 58 will come into service only in case of emergencies, as for example when the light rod 10 binds.

Referring to such emergency conditions, let it be supposed that the light rod 10 binds due to material sticking thereto so that the heavy rod 12 is lifted first and the bracket 54 comes into engagement with the stop 58. The maximum torque of the motor 34 is then available to break the light rod 10 loose from said material. The light rod 10 will then ascend until the limit switch 48 is operated to stop the motor 34 and set the brake 43. This point will be attained a short distance below the stop 56. In other words, under the conditions referred to, the limit switch 48 is operated to stop the motor 34 when the sheave 20 has been moved to a predetermined position, which position will be short of the position wherein the stop members, fixed relative to the try rods, are both engaged with the stop members fixed relative to the receptacle. Due to the extra weight of the rod 12, said rod 12 will descend and pull the light rod up until the bracket 52 comes into abutting relationship with the stop 56, so that zero readings of the instruments 30 and 32 will check with the zero positions of the rods 10 and 12 respectively. The indicating or recording instrument 44 will show the average of the readings of the instruments 30 and 32.

Referring now to the modification illustrated in Figure 2, the weight 60 is omitted together with its functions. In the operation of the structure illustrated in Figure 2 the bracket 52 or 54 which is closer to its corresponding stop 56 or 58 will ordinarily abut its corresponding stop before the other bracket will come into abutting relationship with its corresponding stop. Assuming that the rod 12 with its bracket 54 is more closely adjacent to the stop 58 than is the bracket 52 to the stop 56, under normal conditions, when the motor 34 is started to wind up the drum 38, said bracket 54 will abut the stop 58 before bracket 52 abuts the stop 56. Upon continued operation of the motor 34 and until such time as the limit switch 48 is opened, the rod 10 will continue to rise. The limit switch 48 and the operating mechanism therefor will be so adjusted that the motor 34 will cease to operate and the brake 43 will be applied shortly before the bracket 52 engages the stop 56. If on the other hand the rod 10 should be at such a level that the bracket 52 is closer to the stop 56 than is the bracket 54 to the stop 58, when operation of the motor 34 is initiated to wind up the drum 38, the rod 10 will ordinarily come to rest with the bracket 52 in abutting relationship with the stop 56 while the bracket 54 will come to rest in spaced relationship with the stop 58 when the nut 50 opens the limit switch 48. If either of the rods 10 or 12 should bind, the other will come to rest with its corresponding bracket in abutting relationship with its corresponding stop. If one of said brackets 52 or 54 is in engagement with its corresponding stop, the other will be spaced slightly below its corresponding stop. As mentioned in the discussion of Figure 1, if either rod 10 or rod 12 should bind whereby the other rod is lifted to the upper limit of its travel, the full torque of the motor 34 would be exerted upon the rod which has bound, whereby to loosen said rod and raise it to a position slightly spaced from its corresponding abutment 56 or 58. In Figure 2 the stops 56 and 58 are shown at substantially the same level. The rods 10 and 12 may be of substantially the same length and the same weight. In the construction as illustrated in Figure 2, the rods 10 and 12 may come to rest at different levels, so that the structure shown in Figure 2 lacks certain of the advantages of the structure shown in Figure 1 in that the instruments 30 and 32 cannot be adjusted for zero reading with the rods in raised position with the accuracy which is possible in the construction shown in Figure 1.

Figure 3 shows a modification of the structure shown in Figure 1. According to the structure shown in Figure 3 the rod 12, which carries the weight 60, is shorter than the rod 10. The two stops 56 and 58 are at substantially the same level, fixed relative to the blast furnace 2. In the operation of the construction shown in Figure 3, when the motor 34 is operated to wind up the drum 38 the rod 10, being lighter, will be lifted first and the bracket 52 thereof will abut against its corresponding stop 56. The full torque of the motor 34 will then be applied to lift the heavier rod 12. Assuming, as in the discussion of Figure 1, that the zero positions of the rods 10 and 12 are such that the lower extremities of said rods are on a level with the lower extremity of the large bell 4, said rod 12 will reach its zero position shortly before the bracket 54 reaches the bracket 58. The limit switch 48 and the operating means therefor will be so adjusted as to stop the motor 34 and apply the brake 43 in the position referred to. If on the other hand the rod 10 should bind, due for example to the accumulation of material thereon, the heavier rod 12 may be lifted first and raised to a position wherein the bracket 54 abuts the stop 58, that is—with the rod 12 slightly above its zero position, after which the full torque of the motor will be applied to the rod 10, raising said rod 10 to a position wherein the bracket 52 is in spaced relationship with the stop 56, that is—with the rod 10 slightly below its zero position. The motor 34 will be stopped and the brake 43 applied under the conditions referred to, after which the rod 12, being heavier, will descend, lifting the rod 10 until said rods 10 and 12 are in their zero positions substantially on the level of the bottom edge of the large bell 4.

The present invention provides a construction in which the level of material at a plurality of points may be simultaneously indicated at all times except when the large bell 4 is in dumping position. Not only will the difference in level be indicated, but the average between the indicated positions will be indicated. Moreover, in the preferred embodiments of the present invention the zero positions of the plurality of try rods can be accurately calibrated.

Though certain preferred embodiments of the present invention have been illustrated and described in detail, many modifications will occur to those skilled in the art. It is intended to cover all such modifications that fall within the scope of the appended claims.

What is claimed is—

1. In level indicating mechanism, in combination, a plurality of weighted test members, a cable connecting said test members, sheave means cooperating with said cable intermediate of said test members, motive means for exerting a pull upon said sheave means to lift said test members from their positions of rest, and indicating members cooperating with said cable for indicating the positions of said test members.

2. A level indicating device comprising, in combination, a plurality of weighted members, a cable connecting said members, sheave means cooperating with said cable intermediate of said members, motive means cooperating with said sheave means to hold said cable taut when said weighted members are in operative position and for raising said weighted members into elevated position.

3. A level indicating device comprising, in combination, a plurality of weighted members, a cable connecting said members, sheave means cooperating with said cable intermediate of said members, motive means cooperating with said sheave means to hold said cable taut when said weighted members are in operative position and for raising said weighted members into elevated position, and indicating members cooperating with said cable for indicating the positions of said weighted members.

4. A level indicating device comprising, in combination, a plurality of weighted members, a cable connecting said members, sheave means cooperating with said cable intermediate of said members; motive means cooperating with said sheave means to hold said cable taut when said weighted members are in operative position and for raising said weighted members into elevated position, and brake means cooperating with said motive means for holding said sheave means in predetermined position.

5. A level indicating device comprising, in combination, a plurality of weighted members, a cable connecting said members, sheave means cooperating with said cable intermediate of said members, motive means cooperating with said sheave means to hold said cable taut when said weighted members are in operative position and for raising said weighted members into elevated position, and brake means cooperating with said motive means for holding said sheave means in predetermined position, one of said weighted members being heavier than the other whereby to raise said other weighted member when said sheave means is in a predetermined position and said weighted members are free to move.

6. In a receptacle, in combination, weighted test members, a cable having its ends connected to said test members, sheave means cooperating with said cable intermediate of its ends, motive means adapted to apply a pulling force to said sheave means to lift said test members from their positions of rest, limit switch means for limiting the extent to which said motive means may move said sheave means, and indicating means cooperatively associated with said cable for indicating the positions of said test members.

7. In a receptacle, in combination, weighted test members, a cable having its ends connected to said test members, sheave means cooperating with said cable intermediate of its ends, motive means adapted to apply a pulling force to said sheave means to lift said test members from their positions of rest, limit switch means for limiting the extent to which said motive means may move said sheave means, indicating means cooperatively associated with said cable for indicating the positions of said test members, and stop means for limiting upward movement of said test members, said limit switch means being disposed in position to stop said motive means when one of said test members is in a position short of said stop means.

8. In a receptacle, in combination, weighted test members, a cable having its ends connected to said test members, sheave means cooperating with said cable intermediate of its ends, motive means for applying a pulling force to said sheave means to lift said test members, limit switch means for limiting the extent to which said motive means may move said sheave means, indicating means cooperatively associated with said cable for indicating the positions of said test members, and stop means for limiting upward movement of said test members, one of said test members being heavier than the other of said test members whereby when said sheave means is in a predetermined position said heavier test member may move said lighter test member when said test members are free to move.

9. In combination, a receptacle, weighted test members adapted to rest upon the contents of said receptacle, a cable connected to said test members, a sheave cooperating with an intermediate portion of said cable for communicating lifting movement to said test members, motive means for communicating a movement of translation to said sheave, a stop cooperating with one of said test members, a stop cooperating with the other of said test members, and a limit switch for stopping said motive means when said other of said test members is in a predetermined elevated position short of its stop with said first mentioned test member in engagement with its stop.

10. In combination, a receptacle, weighted test members adapted to rest upon the contents of said receptacle, a cable connected to said test members, a sheave cooperating with an intermediate portion of said cable for communicating lifting movement to said test members, motive means for communicating a movement of translation to said sheave, a stop cooperating with one of said test members, and a limit switch for stopping said motive means when the other of said test members is in a predetermined elevated position with said first mentioned test member in engagement with said stop, one of said test members being heavier than the other of said test members.

11. In level indicating mechanism, in combination, a receptacle, a pair of weighted test members adapted to rest upon the contents of said receptacle, a cable connecting said test members, a sheave cooperating with an intermediate portion of said cable, motive means for applying force to said sheave to communicate a lifting movement to said test members, a limit switch cooperating with said motive means for defining a predetermined elevated position for the lower extremities of said test members, a stop for each of said test members for limiting the upward travel of its corresponding test member, and a bracket cooperatively associated with each of said test members and adapted to engage said stops, the distance between one bracket and its corresponding stop being greater than the distance between the other bracket and its corresponding stop when the lower extremities of said test members are in a predetermined elevated position.

12. In level indicating mechanism, in combination, a receptacle, a pair of weighted test members adapted to rest upon the contents of said receptacle, a cable connecting said test members, a sheave cooperating with an intermediate portion of said cable, motive means for applying force to said sheave to communicate a lifting movement to said test members, a limit switch cooperating with said motive means for defining a predetermined elevated position for the lower extremities of said test members, a stop for each of said test members for limiting the upward travel of its corresponding test member, and a bracket cooperatively associated with each of said test members and adapted to engage said stops, the distance between one bracket and its corresponding stop being greater than the distance between the other bracket and its corresponding stop when the lower extremities of said test members are in a predetermined elevated position, that test member having the greater distance between its bracket and its corresponding stop being heavier than the other test member.

13. In level indicating mechanism, in combination, a plurality of weighted test members, a cable connecting said test members, sheave means cooperating with said cable intermediate of said test members, motive means exerting a pull upon said sheave means to hold said cable taut for prolonged periods and to lift said test members at other times, and indicating means cooperating with said sheave means for indicating the mean level of said test members.

14. A level indicating device for the material within a furnace comprising means including a plurality of test members, a cable connecting said members, a sheave over which said cable is trained, means for exerting a pull upon said sheave to communicate a lifting force to said members, stops for limiting the upward movement of each of said members, said members having means for predetermining, when both of said members are free to move, the sequence of movement of said members when raised or lowered.

15. A material indicating device for the level of material within a furnace comprising means including a plurality of weighted test members, a cable connecting said members, a sheave over which said cable is trained, means for exerting a pull upon said sheave to communicate a lifting force to said members, stops for limiting the upward movement of each of said members, and limit switch means for stopping lifting movement of said members when said sheave is in a predetermined position.

16. A material indicating device for furnaces comprising means including a pair of test members, means for raising and lowering said members, said means including a cable connected to said members, means operable in accordance with the movement of said members for indicating the average level of material in said furnace, stops for limiting upward movement of each of said test members, and means for predetermining when both of said members are free to move the sequence of movement of said members when raised or lowered.

17. A material indicating device for furnaces comprising means including a pair of test members, means for raising and lowering said members, said means including a cable connected to said members, means operable in accordance with the movement of said members for indicating the height of material in said furnace at a plurality of points, means operable in accordance with the movement of said members for indicating the average disposition of material in said furnace, means for limiting upward movement of each of said test members, and means for predetermining when both of said members are free to move the sequence of movement of said members when raised or lowered.

18. A material indicating device for furnaces, comprising means including a pair of test members, a cable connected to said members, means including an equalizer sheave cooperating with said cable for raising and lowering said members, and means for predetermining when both of said members are free to move the sequence of movement of said members when raised or lowered.

19. A material indicating device for furnaces comprising means including a pair of test members, a cable connected to said members, means including an equalizer sheave cooperating with said cable for raising and lowering said members, stops for limiting upward movement of each of said test members, means operable in accordance with movement of said equalizer sheave for indicating the average disposition of material in said furnace, and means for predetermining when both of said members are free to move the sequence of movement of said members when raised or lowered.

20. A material indicating device for furnaces comprising means including a pair of test members, a cable connected to said members, means including an equalizer sheave cooperating with said cable for raising and lowering said members, stops for limiting upward movement of each of said test members, means operable in accordance with the movement of said members for indicating the height of material in said furnace at a plurality of points, means operable in accordance with movement of said equalizer sheave for indicating the average disposition of material in said furnace, and means for predetermining when both of said members are free to move the sequence of movement of said members when raised or lowered.

21. In combination, a receptacle, a plurality of try rods adapted to be positioned upon the contents of said receptacle for indicating the height thereof, a cable connected at its ends to said try rods, a sheave engaging the intermediate portion of said cable, motive means adapted to apply a force to said sheave to control the raising of said try rods from said contents, and indicating means responsive to the movement of said sheave for indicating the mean operative positions of said try rods.

22. In combination, a receptacle the contents of which are to be measured, a pair of try rods, a cable having its extremities connected to said try rods, a sheave cooperating with an intermediate portion of said cable, motive means adapted to apply a lifting force to said sheave to lift said try rods from said contents, and means for indicating at a distance the position of said sheave.

23. In combination, a receptacle, a pair of try rods within said receptacle, a cable having its extremities connected with said try rods, stop members fixed relative to said try rods, stop members fixed relative to said receptacle adapted to abut said first-mentioned stop members, means cooperating with a mid portion of said cable for controlling said cable, motive means for exerting a pull upon said cable through said last-mentioned means, and limit switch means for stopping pull upon said cable when said last-mentioned means has been moved to a predetermined position before both stop members fixed relative to said try rods are engaged with the stop members fixed relative to said receptacle.

24. In combination, a receptacle, a pair of try rods within said receptacle, a cable having its extremities connected with said try rods, a sheave over which said cable is trained, stop members fixed relative to said try rods, stop members fixed relative to said receptacle adapted to abut said first-mentioned stop members, one of said try rods being lighter than the other thereof whereby a pull upon said sheave when both of said members are free to move will result in the lifting of the lighter of said try rods before the lifting of the heavier thereof, and limit switch means for stopping the pull upon said cable before both of said stop members fixed relative to said try rods are engaged with the stop members fixed relative to said receptacle.

25. A level indicating device including a plurality of test members, a cable connecting said members, a sheave over which said cable is trained, means for exerting a pull upon said sheave to communicate a lifting force to said members, stops for limiting the upward movement of each of said members, said members having means for predetermining, when both of said members are free to move, the sequence of movement of said members when raised or lowered, and limit switch means for stopping lifting movement of said members when said sheave is in a predetermined position.

CHARLES G. BIGELOW.
OLAF C. CALLOW.
WILFRED C. SCHOFIELD.